United States Patent [19]

Yonkers

[11] Patent Number: 4,950,013

[45] Date of Patent: Aug. 21, 1990

[54] GARDENING TROWEL

[76] Inventor: E. Hubbard Yonkers, 13 Cooney St., Sommerville, Mass. 02143

[21] Appl. No.: 263,685

[22] Filed: Oct. 28, 1988

[51] Int. Cl.$^5$ .............................................. A01B 1/02
[52] U.S. Cl. .................................... 294/49; 172/381; 294/55; 294/57
[58] Field of Search ............... 294/49, 55, 57, 7, 8, 294/50.6, 51; D8/10; 172/371, 377, 381, 375, 378; 425/276, 279, 282; 15/235.4; 7/114, 116; 16/110 R, 111 R, 116 R; 30/124, 324, 340, 356

[56] References Cited

U.S. PATENT DOCUMENTS

| | | | |
|---|---|---|---|
| D. 180,018 | 4/1957 | Greiner | D8/10 |
| D. 213,014 | 12/1968 | Kimbell | D8/10 |
| D. 292,865 | 11/1987 | Scott | D8/10 |
| 1,884,116 | 10/1932 | Morrow | 294/57 X |
| 2,019,566 | 11/1935 | Gray | 425/276 |
| 2,808,791 | 10/1957 | Phillips et al. | 425/281 X |
| 2,864,117 | 12/1958 | Williams | 294/55 X |
| 3,782,482 | 1/1974 | Miller | 172/381 |
| 4,002,207 | 1/1977 | Bartz | 294/55 X |
| 4,616,867 | 10/1986 | O'Hara | 294/55 |

Primary Examiner—Johnny D. Cherry
Attorney, Agent, or Firm—Robert K. Tendler

[57] ABSTRACT

A gardening trowel is provided to permit easy loosening of earth around plants and the like through the utilization of a handle which is substantially offset from the center line of the trowel to simultaneously provide a pushing post and a lever arm such that the heel of the palm is utilized to press the point of the trowel into the earth. This same offset handle is utilized along with an asymmetric trowel blade to permit easy rotation of the blade, such that upon insertion, the trowel may be rotated by the side or heel of the hand due to the lever arm provided by the offset handle, so as to easily rotate the blade even after insertion of the blade into packed, hardened earth.

5 Claims, 2 Drawing Sheets

GARDENING TROWEL

FIELD OF INVENTION

This invention relates to gardening tools and more particularly to a trowel which is easily inserted into the ground, and is easily rotatable by virtue of an offset handle and an asymmetric blade structure.

BACKGROUND OF THE INVENTION

Many hand-operated trowels have been utilized for gardening in the past in which a blade is symmetrically displaced to either side of the tool center line. This spade-type trowel is provided with a handle which defines the longitudinal center line of rotation of the trowel blade, such that upon insertion into the earth around a plant, the blade is rotated by virtue of gripping the handle and rotating the handle with one's fingers which in turn rotates the blade. This trowel configuration is counter productive in the sense that rotation of the trowel slices through the earth as opposed to loosening.

Moreover, the problem associated with such a trowel having a handle which is coaxial with the longitudinal center line of blade rotation is that for arthritic or physically-impaired people, gripping the handle with enough finger force to permit the blade to both pierce the earth and be turned is difficult if not impossible. This is because the handle slips in the users hand, especially for compacted earth. What this means is that older generations of gardeners are incapable of gardening due to the lack of provision of a tool which permits ready insertion and rotation of a blade into compacted, hard earth.

More particularly, upon insertion of such a prior-art blade into the earth, rotation of the blade is difficult due to the gripping force required. The difficulty arises due to the fact that there is no lever arm upon which to permit the individual to rotate the blade with another part of his hand, rather than his fingers, thereby precluding use by severely handicapped or arthritic persons.

Another problem with a blade symmetrically disposed about the rotation axis of the tool is that upon rotation of the blade handle, while the leading edge may be rotated upwardly to cut into the earth, the trailing edge must be pushed downwardly. Since the trailing edge does not have a cutting edge at all, this results in undue force being required to rotate the tool once inserted into the earth.

In summary, the prior-art trowels which have symmetrically arranged blades about the turning axis are difficult to utilize both from the point of insertion into the earth in a digging operation as well as loosening by twisting.

While there are gardening trowels with a curved handle, the curve is not of such a nature as to permit substantial thrust to be provided by the heel of the hand during insertion, or enough of a lever arm to be used by the side of the hand during a loosening operation in which the trowel is to be rotated.

SUMMARY OF INVENTION

In contradistinction to the prior-art symmetrically bladed trowels, in the Subject Invention a "kick over" handle is provided along the rotational center line of the tool, with the handle providing a pushing surface or post for the insertion thrust of the tool, while at the same time providing a surface located 90 degrees from the thrust surface for providing a lever arm to permit rotation of the offset asymmetric blade of the trowel via the side or heel of one's hand. In order to provide for such ease of operation, the trowel is provided with an asymmetric offset blade, wherein the blade portion lies to one side of the rotational center line of the trowel. The blade is provided with the furthest edge being sharpened, whereas the spine of the blade is rounded to permit easy twisting.

Such a configuration has a number of advantages not only for the infirm or arthritic, but also for gardening in general in that the "kick over" or offset handle initially provides for a thrust surface which is engageable by the palm of the hand such that the blade tip may be inserted into the ground with the full force of a hand regardless of how tight the fingers are around the handle.

This is in contradistinction to the spoon-type blades in which considerable gripping force is necessary upon insertion of the trowel into the earth. The subject trowel can be gripped loosely by the thumb and forefinger and only engaged by the heel of the hand in order to provide enough force for insertion. This eliminates the necessity of squeezing down on any handle.

Additionally, for a loosening operation, the "kick over" or offset handle provides a lever arm which may be engaged by the side or heel of the hand such that the tool may be grasped by its throat by a thumb and forefinger and can be rotated by virtue of only the side or heel of the hand against the side of the offset handle which rotates the tool about the longitudinal center line defined by the throat of the tool. This in turn rotates the offset blade upwardly such that its cutting edge moves upwardly through the earth. Simultaneously, its trailing edge merely acts as a smooth rounded axle or spine for rotation. The offset of the handle is such that it may be offset by as much as 60 degrees or as little as 30 degrees, depending on the amount of lever action desired for the given size trowel. In one embodiment, the top surface of the offset handle is relatively flat to permit the pushing of the trowel into the earth by the heel of the palm of an individual; whereas the side of the same offset lever arm may also be flat for rotation by the side or heel of the hand.

In order to aid in the utilization of the tool by both arthritic and non-arthritic persons, the tool may be of unitary construction and of a plastic material which has a lower thermal conductivity than the prior-art metal tools or even those with plastic handles. It is important for some persons that the coolness of the earth not be transmitted to the fingers or to the hand itself; and this is accomplished by the provision, in one embodiment, of an all plastic, unitary trowel with sufficient rigidity to withstand insertion into the earth and rotation of the offset blade portion, while at the same time, providing for low-thermal conductivity such that the tool will not provide discomfort to the user.

In a still further embodiment, the end of the offset handle may be provided with a flat portion so that the tool when resting on a table or other flat surface, remains upright as opposed to lying over.

In summary, a gardening trowel is provided for use especially by the handicapped or those having arthritic problems to permit loosening of earth around plants and the like through the utilization of a handle which is substantially offset from the center line of the trowel such that the heel of the palm is utilized to press the point of the trowel into the earth. This same offset handle is utilized, along with an asymmetric trowel blade, such that upon insertion, the trowel may be rotated by virtue of the lever arm provided by the offset handle so as to move the offset blade upwardly after insertion of the trowel blade into the earth.

BRIEF DESCRIPTION OF THE DRAWINGS

These and other features of the Subject Invention will be better understood in conjunction with the Detailed Description taken in conjunction with the Figures of which.

DETAILED DESCRIPTION

Figure 1:
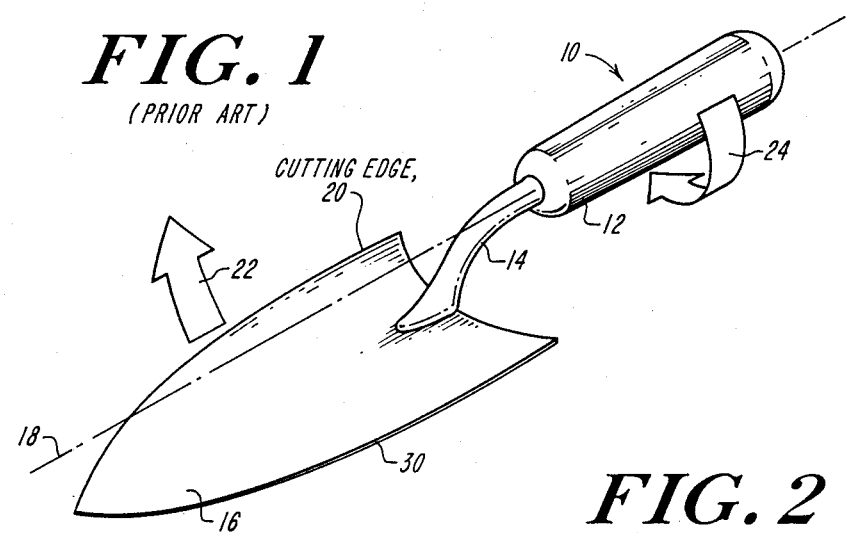
FIG. 1 is a diagrammatic illustration of a prior-art trowel illustrating the rotating of a symmetric blade about the central axis defined by the handle of the tool.
Figure 2:
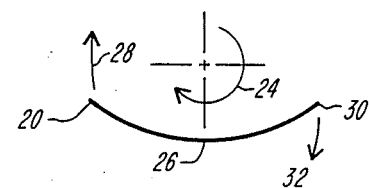
FIG. 2 is a diagrammatic illustration of the rotation of the blade of the trowel of FIG. 1 illustrating the force components when the blade is rotated in the direction illustrated.

Referring now to FIG. 1, the prior-art trowel 10 is illustrated as having a handle 12 connected by an offset throat 14 to a spade or spoon-type blade 16 which is disposed symmetrically about a rotational center line 18 which is utilized to rotate a cutting edge 20, for instance in the direction of arrow 22 with rotation of handle 12 as illustrated by arrow 24. As illustrated in FIG. 2, assuming line 26 to represent a cross section of blade 16, edge 20 is shown to have an upward vector 28 caused by the rotation of handle 12 in the direction of arrow 24, whereas the trailing edge, here illustrated at 30, has a downward component illustrated by arrow 32.

As will be seen, while cutting edge 20 can in effect slice through the earth upon insertion of the prior-art trowel, the trailing edge 30 must move the earth by pressure along the flat bottom portion of the blade. It will be appreciated upon viewing of the prior-art trowel in FIG. 1 that substantial finger gripping force is necessary about handle 12 in order for the spade or blade thereof to be inserted into hard ground; whereas significant finger gripping force is also necessary in order to twist the blade in either cutting direction once the blade is inserted.

Figure 3:
FIG. 3 is an isometric and diagrammatic illustration of the Subject trowel illustrating its characteristic offset handle and corresponding offset blade structure, with the offset handle having a throat portion combined with the spine of the blade to provide for easy twisting of the tool.

In contradistinction to the above, the subject trowel is provided with a throat portion generally indicated by reference character 40 to define a center line 42 for rotation of the device, with a spine portion 44 of an offset blade 46 also defining this longitudinal center line. As seen in FIG. 3, blade 46 includes an elongated spoon-like portion, the longitudinal axis of which is parallel to center line 42.

Throat 40 is provided with an offset handle generally indicated by reference character 50 to include a portion 52 which is offset in a downwardly depending direction from the aforementioned center line. This downwardly depending handle portion has a top surface 54 and a side surface 56, both of which provide for ease of insertion and turning of a trowel in a direction indicated by arrow 58.

Surface 54 of the offset handle is utilized as a pushing post for the insertion of the trowel in the direction of arrow 60 upon insertion of the tip 62 of the trowel blade into the earth and pressure applied to surface 54.

Upon insertion of the trowel blade into the earth and rotation about axis 42 in the direction of arrow 58, pressure on lever arm at point 64 as illustrated by arrow 66 causes working edge 68 of blade 46 to move upwardly as seen by arrows 70.

Figure 4:
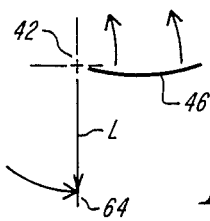
FIG. 4 is a diagrammatic illustration of the force vectors placed on the tool handle, along with the force vectors associated with utilizing the offset trowel of FIG. 3.

As illustrated in FIG. 4, the lever arm is determined by a vector L, such that pressure at point 64 about center line here illustrated at 42 provides for a lever action twisting of the trowel to provide an upward movement of edge 46.

It will be appreciated that since the tool is provided with a rounded spine 44, upon rotation of the tool as illustrated diagrammatically in FIG. 4, there is no counteracting force to prevent the movement of the blade in the indicated direction. This provides for ease of loosening of dirt about a plant. Thus the Subject tool can be utilized not only by normally competent people but also by those people who by virtue of the advancement of years have little or no use of their hands.

As a result, the subject tool is useable by the handicapped or age-impaired due to its unique "kick over" handle which provides for ease of insertion of the trowel blade into the earth as well as rotation of the trowel blade. The offset asymmetric blade also prevents a counteracting force being applied upon rotation which aids in the ability to loosen compacted earth.

Importantly, the blade and the handle structure along with the throat may be made in a unitary plastic configuration in which the material has a low thermal conductivity, such that the temperature of the ground is not transmitted to the hand of the individual using the trowel due to its low thermal conductivity coefficient.

Thus, the trowel may be made of polycarbonate, nylon, polypropylene, or even altogether of wood, which is also a material of low-thermal conductivity.

As can be seen from FIG. 3, the end of handle 50 may be provided with flat surface 72 such that the tool may rest on the counter in an upright position should such be desired.

Figure 5:
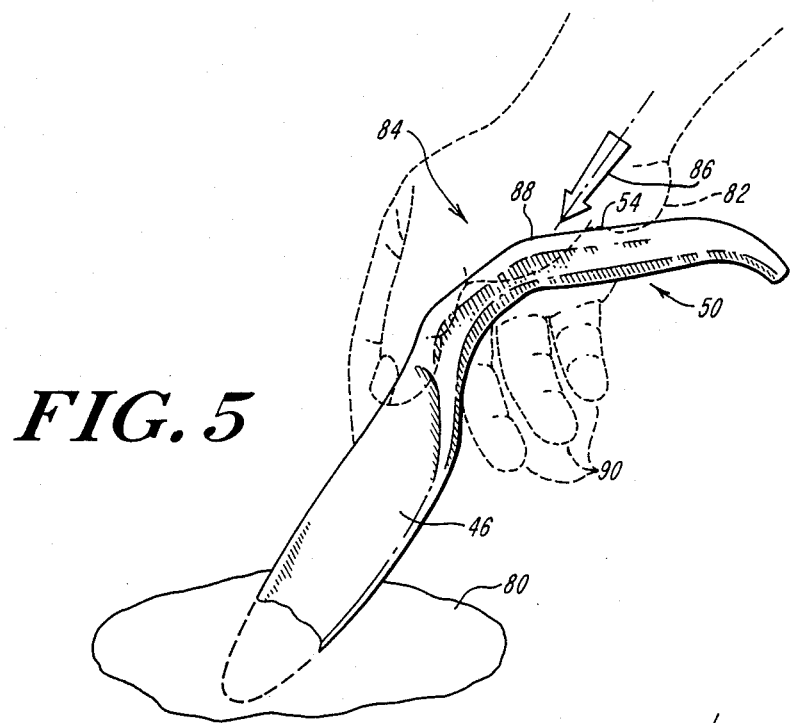
FIG. 5 is a diagrammatic illustration of the insertion of the Subject trowel into the earth illustrating the pressure inserted by the palm of the hand into the offset handle of the trowel of FIG. 3; and, FIG. 6 is a diagrammatic illustration of the utilization of the side of the hand to provide an upward motion to the offset blade edge, thereby to permit loosening of the earth with a minimum of effort.

Referring now to FIG. 5, the subject tool may have its blade 46 inserted into compacted earth here illustrated at 80 via the thrust against top surface 54 of the offset handle 50 by virtue of the heel 82 of the palm of a hand generally indicated by reference character 84 pressing in the direction of arrow 86 against a surface 88. Thus, even if the tool or trowel is grasped merely by the thumb and forefinger, it can be thrust into the earth without contact of the remainder of the fingers here shown by reference character 90. This permits the use of the subject instrument in an easy manner which does not require the gripping of a handle of a trowel.

Figure 6:
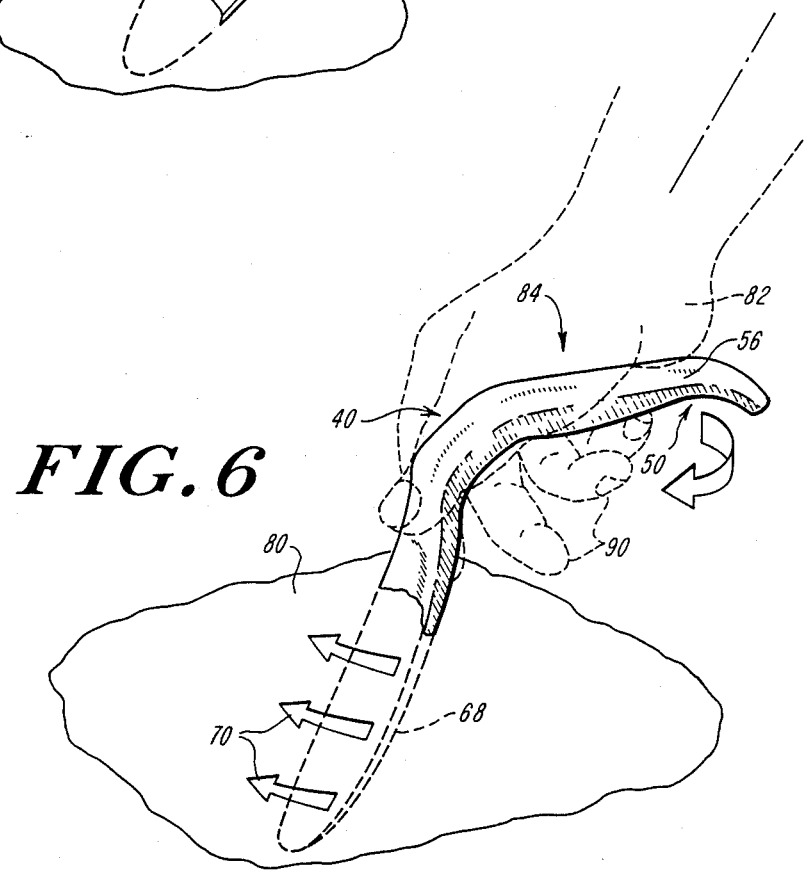

Referring now to FIG. 6, upon insertion of the trowel of FIG. 5 into the earth, its working edge 68 may be rotated in the direction of arrows 70 by virtue of side or heel 82 of hand 84 being pressed against side 56 of handle 50, with only the contact of the thumb and forefinger about the throat 40 of the subject trowel. As can be seen, fingers illustrated in dotted outline 90 need not even touch the handle of the tool in order that the tool be rotated such that its blade move in an upward direction.

In summary, a tool has been provided which is easily thrust into the earth and easily rotated for loosening of the earth with a twisting motion, with the tool importantly being provided with both an offset handle and an offset blade.

Having above indicated a preferred embodiment of the present invention, it will occur to those skilled in the art that modifications and alternatives can be practiced within the spirit of the invention. It is accordingly intended to define the scope of the invention only as indicated in the following claims.

I claim:

1. A trowel designed for improved ease of use, comprising:
    an asymmetric blade having a spine solely to one side thereof and having a spoon-like portion extending parallel to said spine, said spine defining a rotational axis; and
    a handle attached to said blade in a plane including said axis and having a major portion thereof angled to adis axis in an offset manner and in a downward and backward direction below said axis so as to form a top portion engageable by the heel of the hand for trowel insertion and having a side portion engageable by the side or heel of the hand for rotation of the assymetric blade about said axis, whereby manually-imported forces are translated to the trowel to efficiently permit earth tilling.

2. The trowel of claim 1, wherein said offset handle has a throat portion parallel to said axis and wherein said major portion is angled sharply to said axis and has a substantially straight butt portion which forms said top and side portions of the handle.

3. A trowel for tilling earth, comprising:
    an asymmetric blade rotatable about an axis defined by a spine, with the blade including a spoon-like portion solely to one side of the axis and extending parallel to said spine; and,
    an offset handle attached to said blade at one side thereof and angled to said axis in a downward direction said axis.

4. The trowel of claim 3 wherein said trowel is made of poor thermally conducting material.

5. The trowel of claim 3 wherein said trowel is of unitary construction.

* * * * *